(12) United States Patent
Evans et al.

(10) Patent No.: US 6,208,036 B1
(45) Date of Patent: Mar. 27, 2001

(54) POWERTRAIN WITH INTEGRATED MOTOR GENERATOR

(75) Inventors: David Gordon Evans, Rochester; Keith D. Van Maanen, Bloomfield Hills, both of MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/414,196

(22) Filed: Oct. 7, 1999

(51) Int. Cl.[7] ....................................................... F02N 11/04

(52) U.S. Cl. .............................. 290/46; 290/45; 290/22; 180/65.2; 322/40

(58) Field of Search ............................... 290/1 C, 22, 27, 290/45, 46, 52; 180/65.2, 65.3; 318/148; 322/14, 40

(56) References Cited

U.S. PATENT DOCUMENTS

| Re. 36,678 | * | 5/2000 | Moroto et al. | 180/65.4 |
|---|---|---|---|---|
| 5,258,651 | * | 11/1993 | Sherman | 290/23 |
| 5,513,719 | * | 5/1996 | Moroto et al. | 180/65.4 |
| 5,562,565 | * | 10/1996 | Moroto et al. | 477/3 |
| 5,789,823 | * | 8/1998 | Sherman | 290/47 |
| 6,008,545 | * | 12/1999 | Nagano et al. | 290/46 |

* cited by examiner

Primary Examiner—Nicholas Ponomarenko
(74) Attorney, Agent, or Firm—Karl F. Barr, Jr.

(57) ABSTRACT

A hybrid powertrain has an internal combustion engine, a power transmission and an electric drive. The electric drive includes a stator secured in the housing of the power transmission and a rotor secured to the outer periphery of the torque converter of the power transmission. Both the rotor and the impeller of the torque converter are directly connected with the engine. A torque converter clutch is disposed for selective engagement between the impeller and turbine of the torque converter.

4 Claims, 1 Drawing Sheet

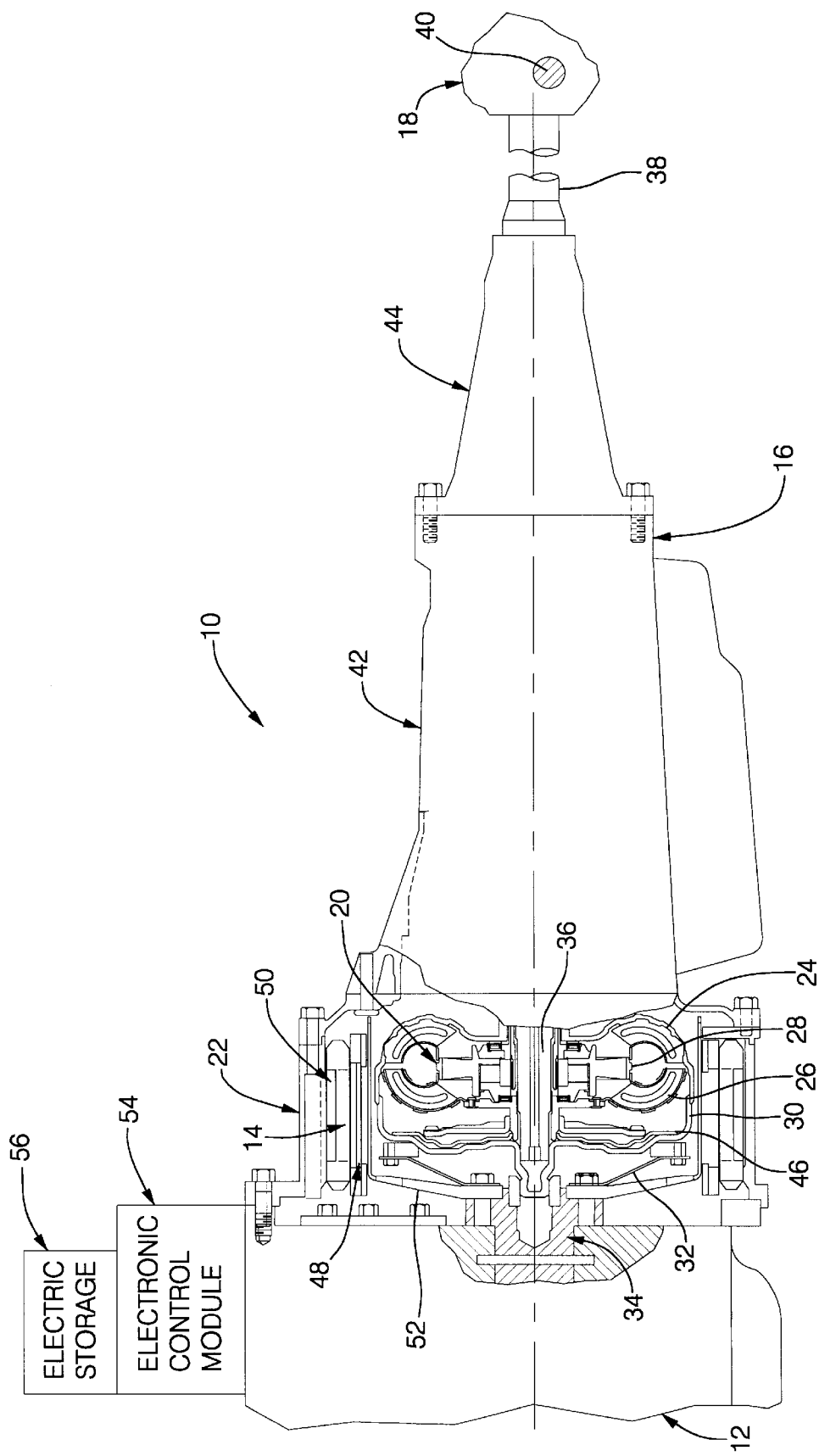

POWERTRAIN WITH INTEGRATED MOTOR GENERATOR

TECHNICAL FIELD

This invention relates to hybrid powertrains and more particularly to hybrid powertrains having an internal combustion engine and an electric motor/generator.

BACKGROUND OF THE INVENTION

Hybrid type powertrains generally employ an internal combustion engine and one or more motor/generator units that operate in concert to provide driving power to the wheels of a vehicle. The electric portion of the vehicle is generally used where noise or exhaust emissions are of prime concern. This type of vehicle is suited for operation in a closed environment (electric drive), such as a passenger terminal, and an open environment (engine drive) such as a parking structure. Thus the vehicle is ideal for transporting passengers from a terminal to a parking structure.

Vehicles employing a hybrid powertrain are also well suited for urban transportation where a significant amount of stop and go driving is undertaken. These vehicles propose electrical regenerative braking to recharge the electrical power storage devices (batteries). During urban travel the powertrain takes advantage of both the internal combustion engine and the electric drive to improve both fuel economy and exhaust emissions. The hybrid powertrain permits the engine to be shut-off at vehicle stops. Restart and or vehicle acceleration is attended to by the electric drive.

The hybrid powertrains are also suited for over-the-road transportation where the electric drive units can be utilized to assist in driving the vehicle during high-power output conditions such as rapid acceleration and hill climbing. The electric drive units might also provide propulsion in the event that engine operation is inadvertently discontinued.

In all of the electro/mechanical hybrid powertrains, the electrical and mechanical drive units are designed to operate in all of the vehicle driving conditions. Also the powertrains generally include planetary type gearing which is designed to effectively combine the electrical and mechanical drive units into an integrated system.

It has been proposed in some systems to position the electric drive between the engine and the transmission. These systems have been termed Flywheel-Alternator-Starter (FAS) systems. The FAS system increases the transmission size in a longitudinal direction and often requires additional radial space. In some FAS systems, for example the U.S. Pat. Nos. 5,258,651 (issued Nov. 2, 1993); 5,285,111 (issued Feb. 8, 1994).to Sherman, the motor/generator and a planetary gear arrangement replace the more conventional torque converter.

SUMMARY OF THE INVENTION

It is an object of the present invention to provide an improved hybrid powertrain having a motor/generator.

In one aspect of the present invention, a hybrid powertrain has an engine, a power transmission, and an electric drive. In another aspect of the present invention, the power transmission and the electric drive are incorporated in a single housing assembly. In yet another aspect of the present invention, the electric drive is a motor/generator (M/G) having a rotor and a stator.

In still another aspect of the present invention, the power transmission has a torque converter positioned between the engine and a planetary gear arrangement, and the rotor of the M/G is secured to the outer periphery of the torque converter. In a further aspect of the present invention, the stator of the M/G is secured within the housing assembly surrounding both the rotor and the torque converter. In yet a further aspect of the present invention, the torque converter size is reduced, the torque converter clutch is engaged at low vehicle speeds and the M/G allows a reduction in the low speed drive line disturbance associated with the early torque converter clutch engagement.

BRIEF DESCRIPTION OF THE DRAWINGS

The drawing is an elevational view, partly in section, of a powertrain incorporating the present invention.

DESCRIPTION OF AN EXEMPLARY EMBODIMENT

A powertrain 10 includes an engine 12, a motor/generator (M/G) 14, a multi-speed power transmission 16 and a final drive 18. The engine 12 is a conventional internal combustion power source or prime mover. The final drive 18 is a conventional gearing mechanism generally comprised of a ring and pinion input and a differential output.

The power transmission 16 has a torque converter 20 which is rotatably disposed in a torque converter housing 22. The torque converter includes an impeller 24, a turbine 26 and a stator 28. The impeller 24 is drivingly connected through an input shell 30 and flex plate 32 with the crankshaft 34 of the engine 12. The turbine 26 is drivingly connected with a transmission input shaft 36 which in turn is connected with the conventional input clutches, not shown, of the power transmission 16.

The power transmission 16 preferably includes a multi-speed planetary gear arrangement, not shown, which may be constructed in accordance with the planetary gear arrangement shown in the United States Pat. No. 4,086,827 issued to Chana on May 2, 1978. Those skilled in the art will be aware of the many other planetary gear and counter-shaft gear arrangements that can be employed with the present invention. The transmission 16 has an output shaft 38 that is drivingly connected with the input gearing of the final drive gearing 18. The final drive gearing has a pair of output shafts or axles 40 that are connected with conventional drive wheels, not shown.

The transmission 16 has a housing comprised of the torque converter housing 22, a main housing 42 and an end housing 44. The main housing supports the planetary gearing and associated friction torque transmitting mechanisms such as clutches and brakes. The end housing44 provided support for the output shaft 38 and a governor, not shown. In some transmission assemblies, the main housing 42, torque converter housing 22, and the end housing 44 are cast as a single unit.

A torque converter clutch 46 is disposed in the torque converter 20 between the input shell 30 and the turbine 26 to provide a selectively engageable drive connection between the turbine 26 and the impeller 24. When the clutch 46 is engaged, the torque converter will operate in a one to one condition without any hydrodynamic slip between the impeller 24 and the turbine 26. As is well-known, the engagement of the torque converter clutch 46 improves the efficiency of the powertrain. It is also well-known that to provide a smooth power flow, the torque converter clutch 46 is not engaged at low vehicle speeds. Such an engagement results in drive line disturbances, such as chuggle, that can be irritating to the operator. To avoid this condition, it has been proposed to incorporate a slipping condition in the clutch 46. This, of course, only recovers a portion of the efficiency gained by a fully engaged clutch.

The M/G 14 includes a stator 50 and a rotor 48. The stator 50 is secured in the torque converter housing 22 which is secured to the engine 12. Alternatively, the stator can be secured directly with the engine block. The rotor 48 is secured to a hub 52 that is drivingly connected with the crankshaft 34 and flex plate 32. The M/G 14 is capable of delivering electrical energy and of converting electrical energy to mechanical energy. A conventional electronic control unit (ECU) 54 is provided to control the condition of the M/G 14 as well as the transmission 16, the engine 12 and the torque converter clutch 46. It will be apparent to those skilled in the art that many assembly configurations are possible which permit the M/G 14 to be retained within the powertrain 10 at a location adjacent the juncture of the engine 12 and the torque converter 20. The concentric arrangement of M/G 14 accommodates a smaller diameter torque converter 20 while a thinner torque converter can be accommodated with a coaxial non-concentric M/G.

As is well-known, the ECU 54 includes a programmable digital computer that collects data, such as speeds, torque, and temperatures to name a few, and distributes control signals to provide the desired shift pattern in the transmission, fuel feed, and torque converter clutch operation, to name a few. The ECU 54 also controls the operation of the M/G 14 to generate electrical energy for storage in an electrical storage device 56, such as a battery or to deliver power to the hub 52. The M/G 14 will provide starting power for the engine 12, or add to the output power of the engine 12. This eliminates the more conventional starter and alternator from the vehicle accessory apparatus. The M/G can also provide power to drive the vehicle through the transmission 16 when the engine 12 is not providing power.

By incorporating the M/G 14 into the torque converter housing 22, the longitudinal dimension of the transmission 16 remains the same through the use of a smaller torque converter and the torque smoothing effect of the M/G 14. The radial dimension of the torque converter housing 22 remains the same when the M/G is located concentrically with the torque converter 20. The incorporation of the M/G 14 permits the torque converter 20 to be reduced in diameter. The M/G 14 is operated as an electric power source when the electric storage 56 need to be replenished or when the vehicle is being decelerated. The M/G 14 is operated as a power source when needed to start the engine 12. The M/G 14 supplies power to counteract the drive line disturbance to permit early or low speed engagement of the clutch 46. The M/G 14 provides torque smoothing during low speed operation with the clutch 46 fully engaged by introducing a counter-phase torque into the system which will smooth the drive-line torque disturbances. Reducing the size of the torque converter 20 will generally result in increased heat generation during vehicle acceleration, however, the M/G 14 permits enforcing low speed engagement of the clutch 46 to alleviate the heat generation that might otherwise occur during slipping with the smaller torque converter. With the present invention, it is possible to maintain the clutch 46 engaged during wide open throttle acceleration.

With the present invention as described above the following advantages are present:

A). similar package size to a conventional powertrain;
B). improved fuel economy;
C). performance and durability;
D). similar driveability;
E). improved (lower) heat generation; and
F). similar rotational inertia which is important for vehicle acceleration. The key features from which these advantages flow are a smaller diameter torque converter, a concentric M/G, early torque converter clutch engagement, and torque smoothing.

What is claimed is:

1. A powertrain comprising:
   an engine;
   a power transmission including a transmission housing having a torque converter portion, a torque converter disposed in said torque converter portion and comprising an impeller and a turbine, and an output shaft, said impeller being drivingly connected with said engine and said turbine being drivingly connected with an input shaft, said output shaft being connected with a final drive mechanism;
   a selectively engageable torque converter clutch mechanism disposed between said impeller and said turbine and being drivingly connected with said turbine; and
   a motor/generator mechanism comprising a rotor disposed concentric with and secured for common rotation with said impeller and said engine, a stator secured stationary relative to said engine and internally of said torque converter portion of said transmission housing.

2. The powertrain defined in claim 1 further wherein said engine, said impeller, said turbine and said rotor rotate in unison when said torque converter clutch is engaged.

3. A powertrain comprising:
   an engine;
   an input shell drivingly connected with said engine;
   a hub drivingly connected with said engine and having a circumferential portion extending concentric with a portion of said input shell;
   a power transmission including a transmission housing having a torque converter portion, a torque converter disposed in said torque converter portion and comprising an impeller and a turbine, said transmission including a gear arrangement and an output shaft, said impeller being drivingly connected with said input shell and said turbine being drivingly connected with an input shaft, said gear arrangement being operatively connected between said input shaft and said output shaft, and said output shaft being connected with a final drive mechanism;
   a selectively engageable torque converter clutch mechanism disposed between said input shell and said turbine and being drivingly connected with said turbine; and
   a motor/generator mechanism comprising a rotor drivingly connected with said circumferential portion of said hub and being disposed coaxial with said impeller, a stator secured internally of said torque converter portion of said transmission housing concentric with said rotor.

4. A powertrain comprising:
   an engine;
   a power transmission including a transmission housing having a torque converter portion, a torque converter disposed in said torque converter portion and comprising an impeller and a turbine, and an output shaft, said impeller being drivingly connected with said engine and said turbine being drivingly connected with an input shaft, said output shaft being connected with a final drive mechanism;
   a selectively engageable torque converter clutch mechanism disposed between said impeller and said turbine and being drivingly connected with said turbine; and
   a motor/generator mechanism comprising a rotor disposed coaxial with and secured for common rotation with said impeller and said engine, a stator secured stationary relative to said engine and internally of said torque converter portion of said transmission housing.

\* \* \* \* \*